(12) United States Patent
Choi et al.

(10) Patent No.: US 7,778,644 B2
(45) Date of Patent: Aug. 17, 2010

(54) APPARATUS AND METHOD FOR MANAGING RESOURCES IN MOBILE COMMUNICATION SYSTEM

(75) Inventors: Sunghyun Choi, Seoul (KR); Youngkyu Choi, Incheon (KR); Yong-Hwan Lee, Seoul (KR)

(73) Assignees: Samsung Electronics Co., Ltd. (KR); Seoul National University Industry Foundation (KR)

( * ) Notice: Subject to any disclaimer, the term of this patent is extended or adjusted under 35 U.S.C. 154(b) by 572 days.

(21) Appl. No.: 11/800,683

(22) Filed: May 7, 2007

(65) Prior Publication Data

US 2007/0291692 A1    Dec. 20, 2007

(30) Foreign Application Priority Data

May 6, 2006   (KR)   ...................... 10-2006-0040787

(51) Int. Cl.
*H04W 72/00*   (2009.01)
*H04W 4/00*    (2009.01)
(52) U.S. Cl. .................. 455/450; 455/452.2; 455/422.1
(58) Field of Classification Search ................ 455/450, 455/452.2, 422.1
See application file for complete search history.

(56) References Cited

U.S. PATENT DOCUMENTS

| 7,174,128 | B2 * | 2/2007 | Yoshii ........................ 455/13.1 |
| 7,342,911 | B2 * | 3/2008 | Tolli et al. ................... 370/345 |
| 2002/0051455 | A1 | 5/2002 | Lee et al. | |
| 2003/0103520 | A1 | 6/2003 | Chen et al. | |
| 2004/0184417 | A1 * | 9/2004 | Chen et al. .................. 370/328 |
| 2005/0281189 | A1 * | 12/2005 | Lee et al. ..................... 370/208 |
| 2006/0234704 | A1 * | 10/2006 | Lee et al. ..................... 455/434 |
| 2007/0115893 | A1 * | 5/2007 | Livet et al. ................... 370/337 |
| 2007/0297386 | A1 * | 12/2007 | Zhang et al. ................. 370/344 |

FOREIGN PATENT DOCUMENTS

| KR | 1020020033362 | 5/2002 |
| KR | 1020030036980 | 5/2003 |
| KR | 1020030045638 | 6/2003 |
| KR | 1020060027502 | 3/2006 |

* cited by examiner

*Primary Examiner*—Vincent P Harper
*Assistant Examiner*—Marisol Figueroa
(74) *Attorney, Agent, or Firm*—The Farrell Law Firm, LLP (57) ABSTRACT

Disclosed is an apparatus and method for managing resources in a mobile communication system. The method includes classifying an overall frequency band into a plurality of segment types defined in time and frequency domains by considering a channel condition between a mobile station and the base station and a QoS level required by the mobile station, if data to be transmitted is data to be transmitted in real time, allocating the data to real-time type segments in such a manner as to satisfy a minimum QoS level for the data, and when there are real-time data remaining after allocating the data, and non-real-time type segments for allocating data to be transmitted in non-real time, diverting and allocating the real-time data to the non-real-time type segments.

15 Claims, 7 Drawing Sheets

APPARATUS AND METHOD FOR MANAGING RESOURCES IN MOBILE COMMUNICATION SYSTEM

PRIORITY

This application claims priority under 35 U.S.C. §119(a) to an application filed in the Korean Industrial Property Office on May 6, 2006 and assigned Serial No. 2006-040787, the contents of which are incorporated herein by reference.

BACKGROUND OF THE INVENTION

1. Field of the Invention

The present invention relates generally to a mobile communication system, and more particularly to an apparatus and method for efficiently managing radio resources in a mobile communication system.

2. Description of the Related Art

In a next generation $4^{th}$ generation mobile communication system, a goal is for users to be provided with services having various Qualities of Service (hereinafter QoS) at a transmission speed of about 100 Mbps.

The $4^{th}$ generation mobile communication system employs an Orthogonal Frequency Division Multiplexing (hereinafter OFDM) scheme which is useful for high-speed data communication in a wired or wireless channel. The OFDM scheme, one of data transmission schemes using a multi-carrier, is a type of Multi-Carrier Modulation (hereinafter MCM) scheme in which a serial input symbol stream is converted into parallel signals which are modulated with multiple orthogonal subcarriers having mutual orthogonality, and then the modulated signals are transmitted.

The $4^{th}$ generation mobile communication system considers both aspects of software and hardware. That is, the $4^{th}$ generation mobile communication system aims to develop more software contents, and a wireless access scheme with high spectrum efficiency and optimal QoS, as to hardware.

It is well-known in the art that factors impeding a high-speed, high-quality data service mostly originate from a channel environment in radio communication. It is a common that a channel environment in radio communication varies due to such factors as Additive White Gaussian Noise (AWGN), a fading-caused change in the power of a received signal, shadowing, Doppler effects occurring according to the movement and frequent velocity change of a terminal, and interference from other terminals and multipath signals.

To remedy these factors, the $4^{th}$ generation mobile communication system copes with variations in a channel environment by adaptively applying, for example, an Adaptive Modulation and Coding (hereinafter AMC) scheme, a Hybrid Automatic Retransmission ReQuest (hereinafter HARQ) scheme, and a Multiple Input Multiple Output (hereinafter MIMO) scheme, and thus can improve the overall system performance.

However, the lack of radio resources, which is a fundamental problem in radio communication, cannot be solved even when the mobile communication systems use any of the various aforementioned schemes. Therefore, there is a need for a new method in which to solve the problem of lack of radio resources, and yet provide a QoS level of real-time traffic required by a mobile station.

SUMMARY OF THE INVENTION

Accordingly, the present invention has been made to solve at least the above-mentioned problems occurring in the prior art, and the present invention provides an apparatus and method for efficiently managing radio resources in a mobile communication system.

In accordance with an aspect of the present invention, there is provided a method for managing resources in a base station of a mobile communication system, the method including classifying an overall frequency band into a plurality of segment types defined in time and frequency domains by considering a channel condition between a mobile station and the base station and a QoS level required by the mobile station, if data to be transmitted is data to be transmitted in real time, allocating the data to real-time type segments in such a manner as to satisfy a minimum QoS level for the data, and when there are real-time data remaining after allocating the data, and non-real-time type segments for allocating data to be transmitted in non-real time, diverting and allocating the real-time data to the non-real-time type segments.

In accordance with an aspect of the present invention, there is provided an apparatus for managing resources in a mobile communication system, the apparatus including a classifier for classifying an overall frequency band into a plurality of segment types defined in time and frequency domains by considering a channel condition between a mobile station and a base station and a QoS level required by the mobile station, and determining whether transmission data is to be transmitted in real time when the transmission data is input, a segment map determiner for determining a real-time type segment map and a diversion ratio, in which real-time type segments are diverted to non-real-time type segments, in such a manner as to satisfy a minimum QoS level for the data if the data is real-time data, and a packet scheduler for diverting and allocating the real-time data to the non-real-time type segments in a manner corresponding to the diversion ratio.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described with reference to the accompanying drawings. It should be noted that the similar components are designated by similar reference numerals although they are illustrated in different drawings. Also, in the following description, a detailed description of known functions and configurations incorporated herein will be omitted for the sake of clarity and conciseness. Further, it should be noted that only parts essential for understanding the operations according to the present invention will be described and a description of parts other than the essential parts will be omitted in order to concisely describe the present invention.

Disclosed herein are a resource management apparatus and method, which can improve resource utility by allocating resources within a range satisfying a minimum QoS level for real-time data traffic and then allocating remaining resources to non-real-time data traffic.

In the present invention, the term "segment" as used hereinafter is newly defined. The segment refers to a region occupied by a number of OFDM symbol intervals in the time domain and a number of subcarriers in the frequency domain. Here, in the case of real-time data traffic, the minimum QoS level indicates a minimum numerical value to be satisfied when a delay condition and a loss rate required by the data traffic are quantified.

The segment will be described in more detail with reference to FIGS. 1 and 2. A mobile communication system in which segments are allocated is referred to as a mobile communication system with a Differential Segment (DiffSeg) structure.

Figure 1:
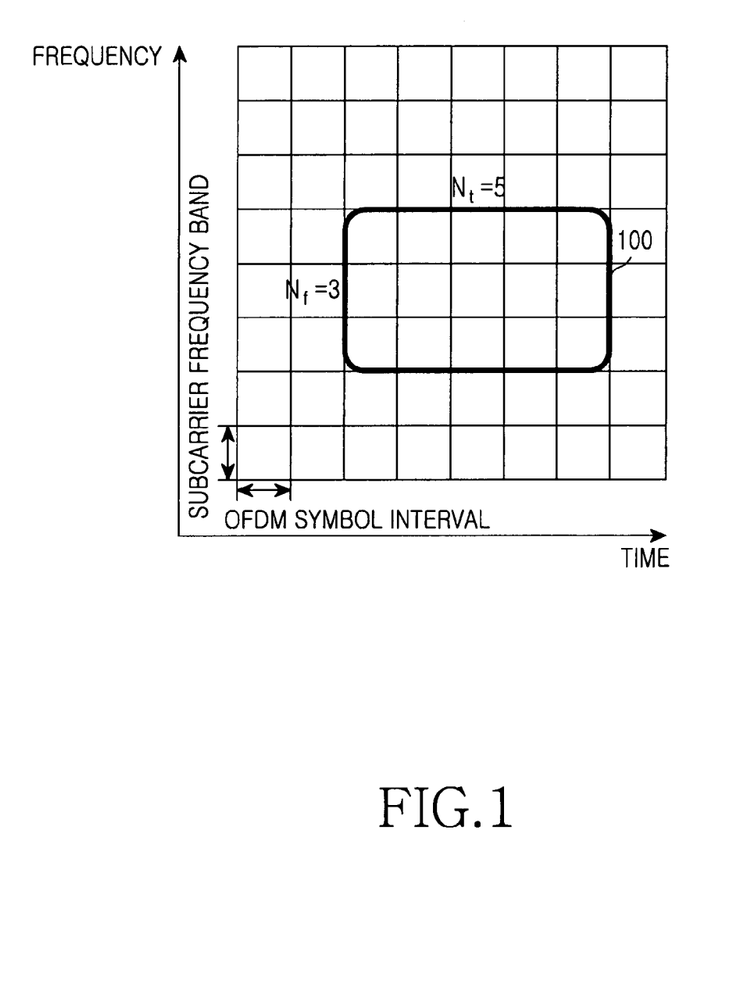
FIG. 1 illustrates segment allocation in a mobile communication system with a differential segment structure in accordance with the present invention.

FIG. 1 illustrates segment allocation in a mobile communication system with a differential segment structure according to the present invention.

Referring to FIG. 1, the abscissa represents the time domain and the ordinate represents the frequency domain. As illustrated in FIG. 1, one segment can transmit $N_t \times N_f$ modulated OFDM symbols. The numbers of OFDM symbol intervals and subcarriers constituting the segment, $N_t$ and $N_f$, may be variably set according to the manner in which the mobile communication system is implemented.

Figure 2:
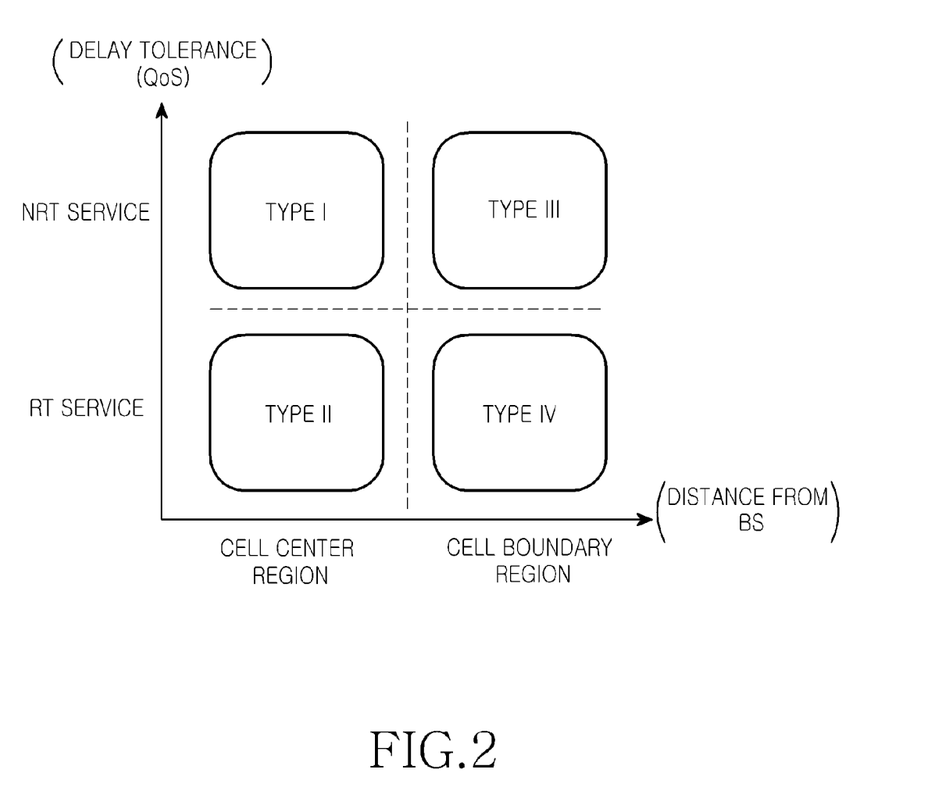
FIG. 2 illustrates segment types supported in a mobile communication system in accordance with the present invention.

FIG. 2 illustrates segment types supported in a mobile communication system according to the present invention.

Referring to FIG. 2, the mobile communication system implements a differential segment structure in which a signal processing scheme and a protocol applied therein are differentiated according to segment types. Here, the segment types are determined by a delay tolerance condition, that is, a QoS level condition, and a condition for a distance from a base station, that is, a channel quality condition. The QoS level condition is for identifying a Real-Time (hereinafter RT) service or a Non-Real-Time (hereinafter NRT) service, and the channel quality condition is for identifying a cell center region or a cell boundary region on the basis of a Carrier to Interference Noise Ratio (hereinafter CINR).

In the present invention, the segment types are classified into 4 types, that is, type I to type IV, according to their priorities.

A type I segment is for supporting an NRT service targeting a mobile station located in a cell center region. A type II segment is for supporting an RT service targeting a mobile station located in a cell center region. A type III segment is for supporting an NRT service targeting a mobile station located in a cell boundary region. A type IV segment is for supporting an RT service targeting a mobile station located in a cell boundary region.

Figure 3:
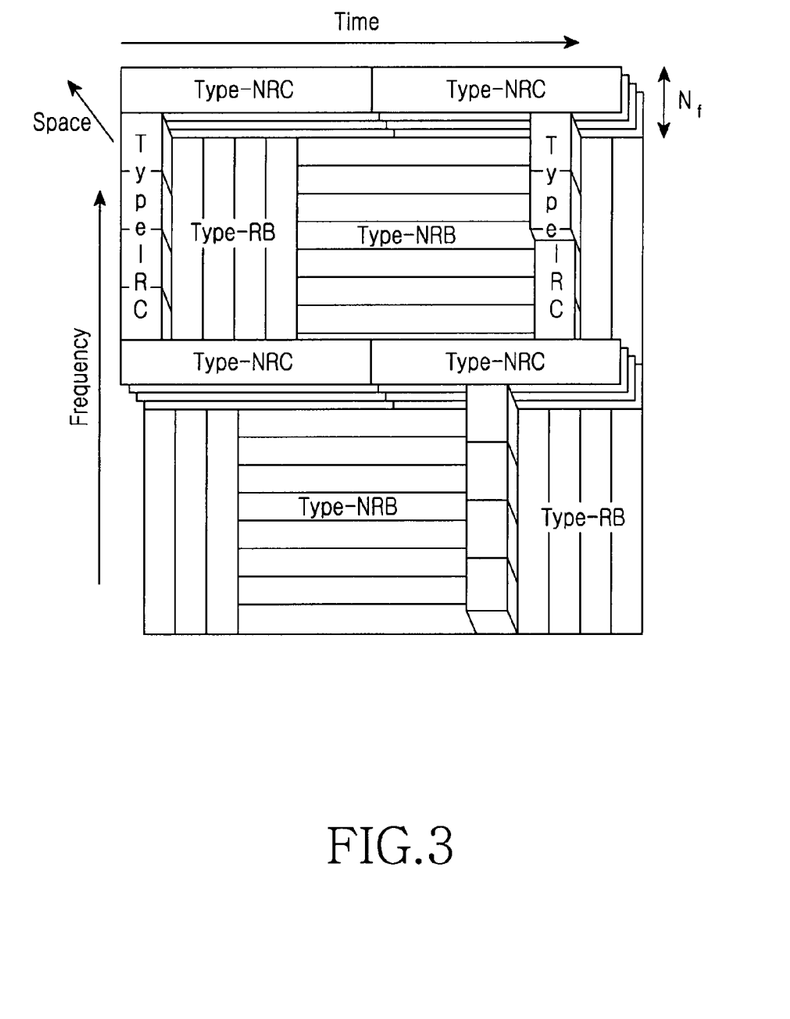
FIG. 3 illustrates a resource map structure in a mobile communication system to which a differential segment structure is applied in accordance with the present invention.

FIG. 3 illustrates a resource map structure in a mobile communication system to which a differential segment structure is applied according to the present invention.

The differential segment structure illustrated in FIG. 3 corresponds to a resource map structure in which segments of different types are mapped to actual physical channels. The same signal processing scheme or different signal processing schemes may be applied to the segments of different types. The respective segments may have different sizes and shapes according to their types, which results in a two-dimensional map structure in the time and frequency domains. It is possible to change the resource map structure, to which the differential segment structure is applied, to patterns other than that illustrated in FIG. 3.

Referring to FIG. 3, an RT type segment may be designed in the form of a quadrangle, which is short in the time domain and long in the frequency domain, in order to be susceptible to a delay condition and obtain a frequency diversity. An NRT segment may also be designed in the form of a quadrangle, which is short in the frequency domain and long in the time domain, in order to be insusceptible to a delay condition and enable opportunistic scheduling.

In a static allocation scheme of resource allocation schemes, RT service connections are allocated to RT type segments, and NRT service connections are allocated to NRT type segments. However, the present invention discloses a new segment diversion allocation scheme as a resource allocation scheme, which is different from the conventional static allocation scheme.

In the segment diversion and allocation scheme, data traffic corresponding to an RT connection is serviced using an NRT type segment. While communication reliability can be improved by obtaining a diversity and applying an HARQ scheme in RT type segment allocation, spectrum efficiency can be improved by applying an opportunistic scheduling scheme and an AMC scheme in NRT type segment allocation. Thus, if RT data traffic is allocated to an NRT type segment, the degree of QoS satisfaction may be lowered in comparison with the static allocation scheme, but high spectrum efficiency makes it possible to satisfy a bandwidth required by an RT connection by using relatively less resources.

However, segment diversion is not allowed for all RT data traffics. This is because an NRT type segment requires feedback information about an instantaneous channel condition so as to apply opportunistic scheduling, and thus diversion to an NRT type segment is impossible if there is no NRT connection of a mobile station.

When the overall set of RT connections is represented by $\Lambda$, it is possible to perform segment diversion for RT connections corresponding to 6 subsets $\Lambda_1, \Lambda_2, \Lambda_3, \Lambda_4, \Lambda_5, \Lambda_6$ as given below in Table 1.

TABLE 1

| subset of RT connections | types of segments used by correspondingmobile station |
| --- | --- |
| $\Lambda_1$ | RC |
| $\Lambda_2$ | RC, NRC |
| $\Lambda_3$ | RC, NBR |
| $\Lambda_4$ | RB |
| $\Lambda_5$ | RB, NRC |
| $\Lambda_6$ | RB, NRB |

In Table 1, RC denotes an RT Center segment (i.e., type III in FIG. 2), NRC denotes an NRT Center segment (i.e., type I in FIG. 2), RB denotes an RT Boundary segment (i.e., type IV in FIG. 2), and NRB denotes an NRT Boundary segment (i.e., type II in FIG. 2).

Reference will now be made to a segment diversion method and a manner to select a segment map. Here, it is necessary to seek a segment diversion method which can satisfy QoSs corresponding to RT connections when a given number of RT connections exist, and can simultaneously maximize the amount of remaining resources that can be used for NRT connections, that is, the number of remaining segments.

Assuming that $\phi$ is the overall set of segment maps, a kth segment map can be defined by $\phi_k=[\phi_{1k}, \phi_{2k}, \phi_{3k}, \phi_{4k}]^T$, where $k=1, 2, \ldots, |\Phi|$, and $\phi_{jk}$ (j=1, 2, 3, 4) represents the ratio of each segment type. Here, j=1, 2, 3, 4 denotes each of RC, RB, NRC and NRB, and superscript "T" denotes "transpose". Further, the QoS state value of an ith RT connection is defined by $r_i=[r_{i1}, r_{i2}]^T$. Here, $r_{i1}$ and $r_{i2}$ denote a QoS state value that may be expected when an RT connection is serviced by a corresponding RT type segment, and a QoS state value that may be expected when the RT connection is serviced by an NRT type segment through segment diversion, respectively. In general, $r_{i1}$ may have a value greater than that of $r_{i2}$, and $r_{i2}$ values of RT connections, corresponding to $\Lambda_1$ and $\Lambda_4$ in Table 1 are 0 (zero).

The transfer rate vector of an ith RT connection is defined by $\alpha_i=[\alpha_{i1}, \alpha_{i2}]^T$. Here, $\alpha_{i1}$ and $\alpha_{i2}$ denote a transfer rate in servicing an RT connection by a corresponding RT type segment and an average transfer rate in servicing the RT connection by an NRT type segment through segment diversion, respectively. Since the NRT type segment uses opportunistic scheduling and an AMC scheme, $\alpha_{i2}$ is greater than $\alpha_{i1}$. A unit of the transfer rate is defined by the number of transmittable bits per segment (bits/segment).

In addition, $b_i$ is a bandwidth required for an ith RT connection, and has a unit of bits per frame (bits/frame). Further, $n_i=[n_{i1}, n_{i2}]^T$ is a segment diversion vector having elements defined by the rate of traffic that is not subjected to segment diversion from among traffic of an ith RT-connection, and the rate of traffic that is subjected to segment diversion from among the traffic of the ith RT connection, respectively.

Reference will now be made to a manner in which to seek a segment diversion vector $n_i$ that maximizes NRT connection resources when an NRT type segment is diverted for an RT connection, by using the following equations.

$$R := \max\{R_k : \phi_k \in \Phi\} \qquad 1$$

In Equation (1), $R_k$ is the optimal value of an kth subproblem defined below in Equations (2) to (8). In other words, R indicates a maximum target value that can be obtained among all segment maps when a segment diversion rule algorithm is applied. The target value indicates the amount of segments that can be used for NRT connections while the QoS conditions of RT connections are satisfied.

$$R_k := \max\left(X(\phi_{3k} + \phi_{4k}) - \sum_{i \in \Lambda_2 \cup \Lambda_3 \cup \Lambda_5 \cup \Lambda_6} \frac{b_i}{\alpha_{i2}} n_{i2}\right) \qquad 2$$

In Equation (2), $R_k$ denotes a maximum target value that can be obtained according to diversion ratio optimization determination when a kth segment map is determined.

Constraint conditions for satisfying Equation (2) are as follows:

$$\sum_{i \in \Lambda_2 \cup \Lambda_3} \frac{b_i}{\alpha_{i1}} n_{i1} \leq X\phi_{1k} - \sum_{i \in \Lambda_1} \frac{b_i}{\alpha_{i1}} \qquad 3$$

$$\sum_{i \in \Lambda_5 \cup \Lambda_6} \frac{b_i}{\alpha_{i1}} n_{i1} \leq X\phi_{2k} - \sum_{i \in \Lambda_4} \frac{b_i}{\alpha_{i1}} \qquad 4$$

$$\sum_{i \in \Lambda_2 \cup \Lambda_5} \frac{b_i}{\alpha_{i2}} n_{i2} \leq X\phi_{3k} \qquad 5$$

$$\sum_{i \in \Lambda_3 \cup \Lambda_6} \frac{b_i}{\alpha_{i2}} n_{i2} \leq X\phi_{4k} \qquad 6$$

$$r_{i1} n_{i1} + r_{i2} n_{i2} \geq \rho_i, \; i \in \Lambda_2 \cup \Lambda_3 \cup \Lambda_5 \cup \Lambda_6 \qquad 7$$

$$n_{i1} n_{i2} = 1, \; n_{i1} \geq 0, \; n_{i2} \geq 0, \; i \in \Lambda_2 \cup \Lambda_3 \cup \Lambda_5 \cup \Lambda_6 \qquad 8$$

In Equations (2) to (8), $b_i$ denotes a bandwidth required by an ith RT connection, and has a unit of bits per frame (bits/frame). Further, $\rho_i$ denotes a minimum QoS requirement level of the ith RT connection, and X denotes the total number of segments that can be used during a Media Access Control (hereinafter MAC) frame. X is a constant irrespective of a segment map index.

Equation (2) is an objective function for solving Equation (1), and indicates the total amount of resources that can be used for NRT connections. Equations (3) to (6) represent constraint conditions for the minimum ratio value of a jth segment type (j=1, 2, 3, 4) when segment diversion is performed. Equation (7) represents a satisfactory condition of QoS for an ith RT connection, and Equation (8) is a conditional equation for $n_i$.

If the value of $n_{i2}$ is approximated to the value of $n_{i1}$ by using Equation (8), a linear optimization problem P1 (Equation (11)) consisting of optimization variables as many as $|\Lambda_2 \cup \Lambda_3 \cup \Lambda_5 \cup \Lambda_6|$, can be derived. Equations (9) and (10) as given below are used in order to simplify Equation (11).

$$\omega_{i1} := \frac{b_i}{\alpha_{i1}}, \; \omega_{i2} := \frac{b_i}{\alpha_{i2}} \text{(segments/frame)} \qquad 9$$

$$\gamma_i := \frac{(\rho_i - r_{i2})}{r_{i1} - r_{i2}}, \; m_i := n_{i1} - \gamma_i, \; \Pi_{jk} := X\phi_{jk} \qquad 10$$

$$R_k + \sum_{i \in \Lambda_2 \cup \Lambda_3 \cup \Lambda_5 \cup \Lambda_6} (1 - \gamma_i)\omega_{i2} = \max \Pi_{3k} + \Pi_{4k} + \sum_{i \in \Lambda_2 \cup \Lambda_3 \cup \Lambda_5 \cup \Lambda_6} \omega_{i2} m_i \qquad 11$$

Constraint conditions or satisfactory conditions related to Equation (11) are as follows:

$$\Pi_{1k} - \sum_{i \in \Lambda_2 \cup \Lambda_3} \omega_{i1} m_i \geq \sum_{i \in \Lambda_1} \omega_{i1} + \sum_{i \in \Lambda_2 \cup \Lambda_3} \gamma_i \omega_{i1} \qquad 12$$

$$\Pi_{2k} - \sum_{i \in \Lambda_5 \cup \Lambda_6} \omega_{i1} m_i \geq \sum_{i \in \Lambda_4} \omega_{i1} + \sum_{i \in \Lambda_5 \cup \Lambda_6} \gamma_i \omega_{i1} \qquad 13$$

$$\Pi_{3k} - \sum_{i \in \Lambda_2 \cup \Lambda_5} \omega_{i2} m_i \geq \sum_{i \in \Lambda_2 \cup \Lambda_5} (1 - \gamma_i)\omega_{i2} \qquad 14$$

$$\Pi_{4k} - \sum_{i \in \Lambda_3 \cup \Lambda_6} \omega_{i2} m_i \geq \sum_{i \in \Lambda_3 \cup \Lambda_6} (1 - \gamma_i)\omega_{i2} \qquad 15$$

$$0 \leq m_i \leq 1 - \gamma_i, \; i \in \Lambda_2 \cup \Lambda_3 \cup \Lambda_5 \cup \Lambda_6 \qquad 16$$

The value of R in Equation (1) can be evaluated by solving the linear optimization problem of Equation (11) $|\Phi|$ times. However, although the number of segment maps is finite, it is not small enough to evaluate $\Phi_k$ and $n_i$ during an MAC frame with a time interval. Therefore, there is a need for an algorithm that can determine the value of R within a short time while minimizing the amount of operations.

Figure 4:
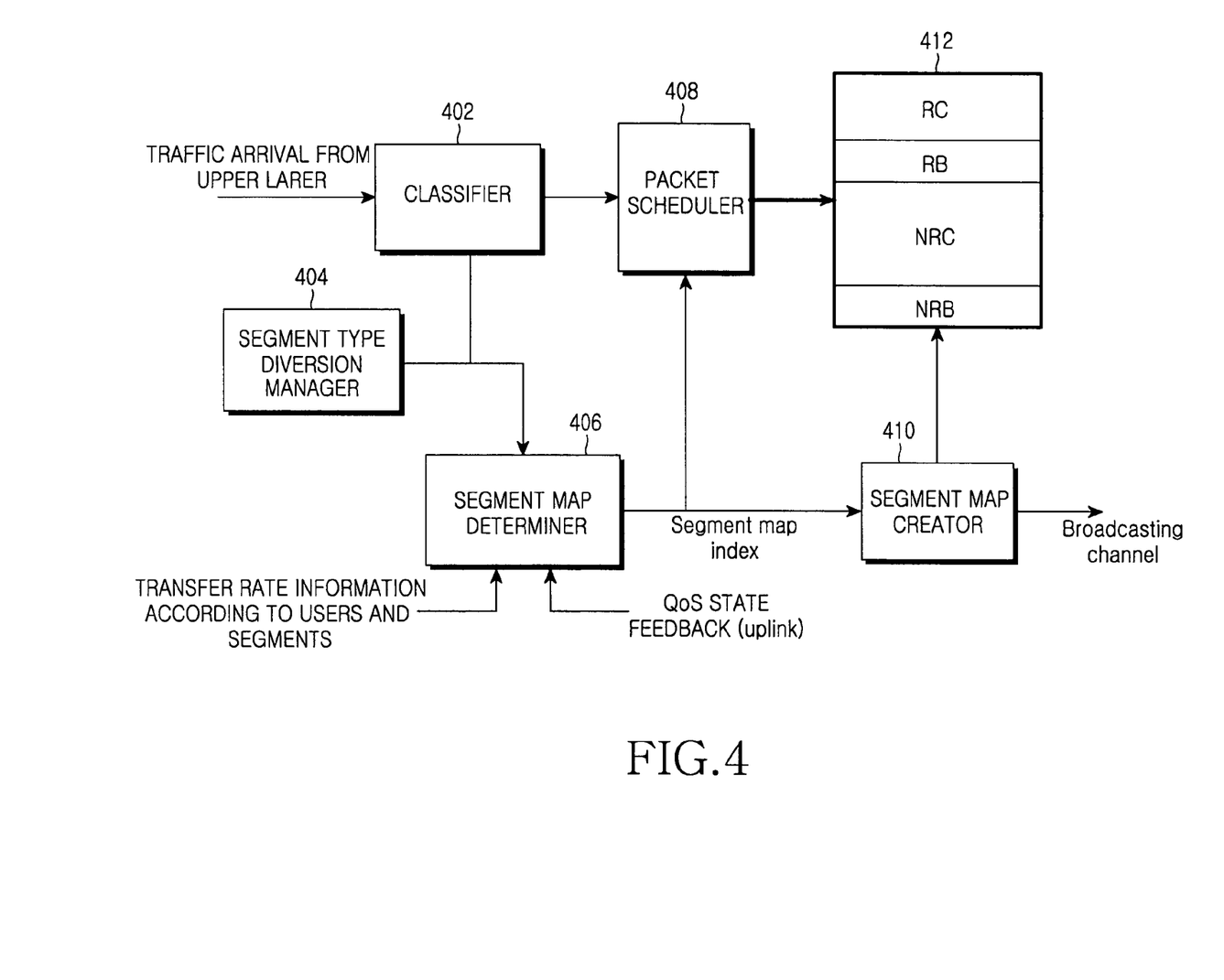
FIG. 4 illustrates an apparatus including a segment map determiner in a mobile communication system to which a differential segment structure is applied in accordance with the present invention.

FIG. 4 illustrates an apparatus including a segment map determiner in a mobile communication system to which a differential segment structure is applied according to the present invention.

Referring to FIG. 4, traffic from an upper layer is input into a classifier 402 that considers a QoS type according to each connection. The traffic classified by the classifier 402 is input into a queue according to each connection, which is included in a packet scheduler 408. The segment map determiner 406, together with a segment type diversion manager 404, determines a segment diversion ratio and a segment map index by making reference to transfer rate information and QoS state information according to each mobile station and segment, and outputs them to the packet scheduler 408 and a segment map creator 410, respectively. The segment type diversion manager 404 determines which type of segment is to be used from among RC, RB, NRC and NRB by tracking radio channel variations of a corresponding mobile station, and controls the segment map determiner 406, based on the determination. The segment map creator 410 changes a map configuration so as to correspond to information on the determined segment map index, and broadcasts the newly determined map index information to all mobile stations. The packet scheduler 408 schedules each segment by using the determined segment diversion ratio.

In summary, the apparatus according to the present invention first has to identify whether traffic handed down from an upper layer is RT data traffic or NRT data traffic. Further, a transfer rate $\alpha_i$ corresponding to each segment type and a QoS satisfaction index $\gamma_i$ for an RT connection is needed as input parameters according to each mobile station. Information on the transfer rate is already known by a base station side, and thus information to be fed back from a mobile station is $\gamma_i$. It is possible to numerically quantify $\gamma_i$ by means of a delay time, etc. according to segment type, which are measured by each mobile station.

As a result of performing the algorithm, an optimal segment map index and a segment diversion rate according to each connection, $n_i$, are finally output. If an index different from a currently employed segment map index is calculated, then a map configuration is changed through the segment map creator, and the changed map index is broadcasted to mobile stations within a cell in order to use it in the next frame. The segment diversion rate according to each connection, $n_i$, is utilized as input information for the packet scheduler. Further, a diverted RT type segment has priority over an NRT type segment, and thus can be utilized in a direction to enhance the QoS satisfaction index of an NRT type segment.

Using a mixed integer program, Equation (11) will now be transformed into Equation (17) as given below. In Equation (17), the sub-problems of Equations (11) to (16) can be modified into one mixed integer problem by introducing a variable $y_k$ with values of 0 and 1.

$$R + \sum_{i \in \Lambda_2 \cup \Lambda_3 \cup \Lambda_5 \cup \Lambda_6} (1-\gamma_1)\omega_{i2} = \max \sum_{i \in \Phi} (\Pi_{3k} + \Pi_{4k}) + \sum_{i \in \Lambda_2 \cup \Lambda_3 \cup \Lambda_5 \cup \Lambda_6} \omega_{i2} m_i \qquad 17$$

Constraint conditions or satisfactory conditions related Equation (17) are as follows in Equations (18) to (23):

$$\sum_{k \in \Phi} \Pi_{1k} y_k - \sum_{i \in \Lambda_2 \cup \Lambda_3} \omega_{i1} m_i \geq \sum_{i \in \Lambda_1} \omega_{i1} + \sum_{i \in \Lambda_2 \cup \Lambda_3} \gamma_i \omega_{i1} \qquad 18$$

$$\sum_{k \in \Phi} \Pi_{2k} y_k - \sum_{i \in \Lambda_5 \cup \Lambda_6} \omega_{i1} m_i \geq \sum_{i \in \Lambda_4} \omega_{i1} + \sum_{i \in \Lambda_5 \cup \Lambda_6} \gamma_i \omega_{i1} \qquad 19$$

$$\sum_{k \in \Phi} \Pi_{3k} y_k - \sum_{i \in \Lambda_2 \cup \Lambda_5} \omega_{i2} m_i \geq \sum_{i \in \Lambda_2 \cup \Lambda_5} (1-\gamma_i)\omega_{i2} \qquad 20$$

$$\sum_{k \in \Phi} \Pi_{4k} y_k - \sum_{i \in \Lambda_3 \cup \Lambda_6} \omega_{i2} m_i \geq \sum_{i \in \Lambda_3 \cup \Lambda_6} (1-\gamma_i)\omega_{i2} \qquad 21$$

$$\sum_{i \in \Phi} y_k = 1, y_k \in \{0, 1\}, k \in \Phi \qquad 22$$

$$0 \leq m_i \leq 1 - \gamma_i, i \in \Lambda_2 \cup \Lambda_3 \cup \Lambda_5 \cup \Lambda_6 \qquad 23$$

Equation (17) can be solved using a branch and boundary method. The branch and boundary method is for finding an optimal solution in various optimization problems, and was first introduced by A. H. Land and A. G Doig in 1960. It is assumed that a solution sought by the branch and boundary method is the optimal solution of Equation (17).

Reference will now be made to a maximum diversion rule algorithm for segment diversion, as newly disclosed herein.

The maximum diversion rule algorithm enables Equation (17) to be solved by a greedy method. A maximum net gain obtainable through segment diversion of an ith RT connection can be represented by the following Equation (24):

$$D(i) = b_i \left( \frac{1}{\alpha_{i1}} - \frac{1}{\alpha_{i2}} \right) \left( \frac{r_{i1} - \rho_i}{r_{i1} - r_{i2}} \right) \qquad 24$$

Analyzing Equation (24), it can be noted that a gain obtainable through segment diversion increases as the transfer rate of an NRT type segment increases well beyond that of an RT type segment, the QoS satisfaction index of an NRT type segment increases, the QoS requirement condition of RT traffic decreases and the required bandwidth of RT traffic increases. Based on the foregoing, a maximum diversion rule algorithm as illustrated in FIG. 5 is disclosed.

Figure 5:
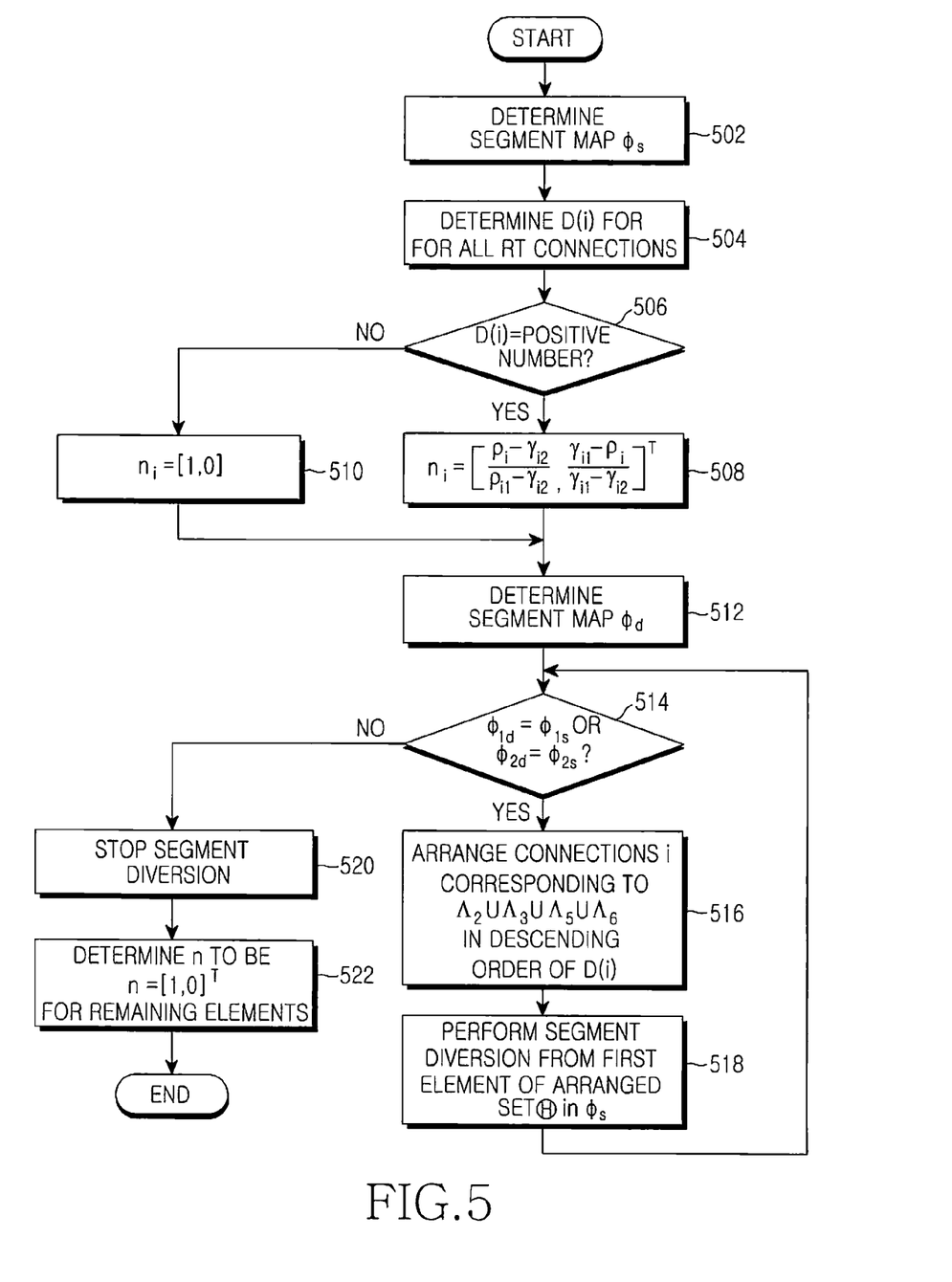
FIG. 5 illustrates a procedure of diverting segments in accordance with the present invention.

FIG. 5 illustrates a procedure of diverting segments according to the present invention.

In FIG. 5, a description will be given in terms of the operation of a segment diverter corresponding to a unit for diverting a segment for RC data traffic to a segment used for NRT data traffic.

Referring to FIG. 5, in step 502, the segment diverter first determines a segment map $\phi_s$, and then proceeds to step 504. In step 504, the segment diverter determines D(i), represented in Equation (24), for all RT connections i corresponding to $\Lambda_2 \cup \Lambda_3 \cup \Lambda_5 \cup \Lambda_6$, and then proceeds to step 506. In step 506, the segment diverter determines if D(i) is a positive number. If D(i) is a positive number, the segment diverter proceeds to step 508, and otherwise proceeds to step 510. Here, D(i) indicates a net gain that is expected when a segment for an ith RT connection is diverted to an NRT type segment.

In step 508, the segment diverter determines $n_i$ to be $$n_i = \left[\frac{\rho_i - \gamma_{i2}}{\gamma_{i1} - \gamma_{i2}}, \frac{\gamma_{i1} - \rho_i}{\gamma_{i1} - \gamma_{i2}}\right]^T,$$

and then proceeds to step 512. In step 520, the segment diverter determines $n_i$ to be $n_i=[1,0]^T$, and then proceeds to step 512.

In step 512, the segment diverter determines a segment map $\phi_d$ from an RT segment ratio $\Phi$ by using $n_i$ determined in step 508 or 510, and then proceeds to step 514.

In step 514, the segment diverter determines whether $\phi_{1d} \neq \phi_{1s}$ and $\phi_{2d} \neq \phi_{2s}$ are true. A result of the determination shows that $\phi_{1d} \neq \phi_{1s}$ and $\phi_{2d} \neq \phi_{2s}$ are true, the segment diverter proceeds to step 520, and otherwise proceeds to step 516.

In step 516, the segment diverter arranges connections i corresponding to $\Lambda_2 \cup \Lambda_3 \cup \Lambda_5 \cup \Lambda_6$ in descending order of D(i), and then proceeds to step 518. In step 518, the segment diverter sequentially performs segment diversion from the first element of $\Theta$ in $\phi_s$, and returns to step 514 at every segment diversion. If, for the first time, $\phi_{1d}$ and $\phi_{2d}$ become equal to $\phi_{1s}$ and $\phi_{2s}$, respectively, the segment diverter stops segment diversion in step 520, and then proceeds to step 522. In step 522, if the index of an element for which segment diversion is stopped corresponds to j, the segment diverter determines $n_i$ to be $n_i=[1,0]^T$ for a (j+1)th element to the last element.

In summary, the maximum diversion rule algorithm is performed in such a manner that a segment map attainable by diverting as many segments as possible is previously calculated, segment diversion is applied starting from an RT connection having a large gain, and segment diversion is stopped after map determination. The reason not to perform segment diversions after map determination is that further segment diversion only lowers QoS, and cannot increase the amount of remaining resources.

The maximum diversion rule algorithm corresponds to a heuristic algorithm that discovers an optimal value by trial and error. Thus, it is necessary to appraise the maximum diversion rule algorithm.

As stated above, a total of 4 segment types are defined in the present invention. However, since RT segments are classified according to the number of antennas and use almost similar elementary technology, only 3 segment types will be appraised.

A segment map can be created as follows: When one MAC frame is configured with 23 clusters, each cluster has the same pattern. Here, the cluster consists of 184 segments. Thus, if a distribution ratio between 3 segment types is determined for one cluster, the overall segment map is automatically determined. For one cluster, NRT type segments and RT type segments are distributed in a ratio of $\zeta$: 23−$\zeta$($\zeta$=0, 1, ..., 23). The NRT type segments in turn consist of NRC type segments and NRB type segments in a ratio of $\psi$: 8−$\psi$($\psi$=0, 1, ..., 8). Since only one pattern occurs when $\zeta$=0, the total number of configurable segment maps is 208. When a segment map index i (i=1, 2, ..., 208) is given, $\zeta$(i) and $\psi$(i) are determined by the following Equations (25) and (26), respectively:

$$\varsigma(i) = \begin{cases} 0, & i = 1 \\ \left\lfloor \frac{i-2}{9} \right\rfloor + 1, & i \neq 1 \end{cases} \quad 25$$

$$\psi(i) = (i-2) - 9\left\lfloor \frac{i-2}{9} \right\rfloor, i \neq 1 \quad 26$$

As determined in Equations (25) and (26), 23×$\Theta$(i)×$\psi$(i) NRC type segments, 23×$\zeta$(i)×(8−$\psi$(i)) NRB type segments, and 23×$\zeta$(i)×(8−$\psi$(i)) RT type segments are allocated to every frame.

Figure 6A:
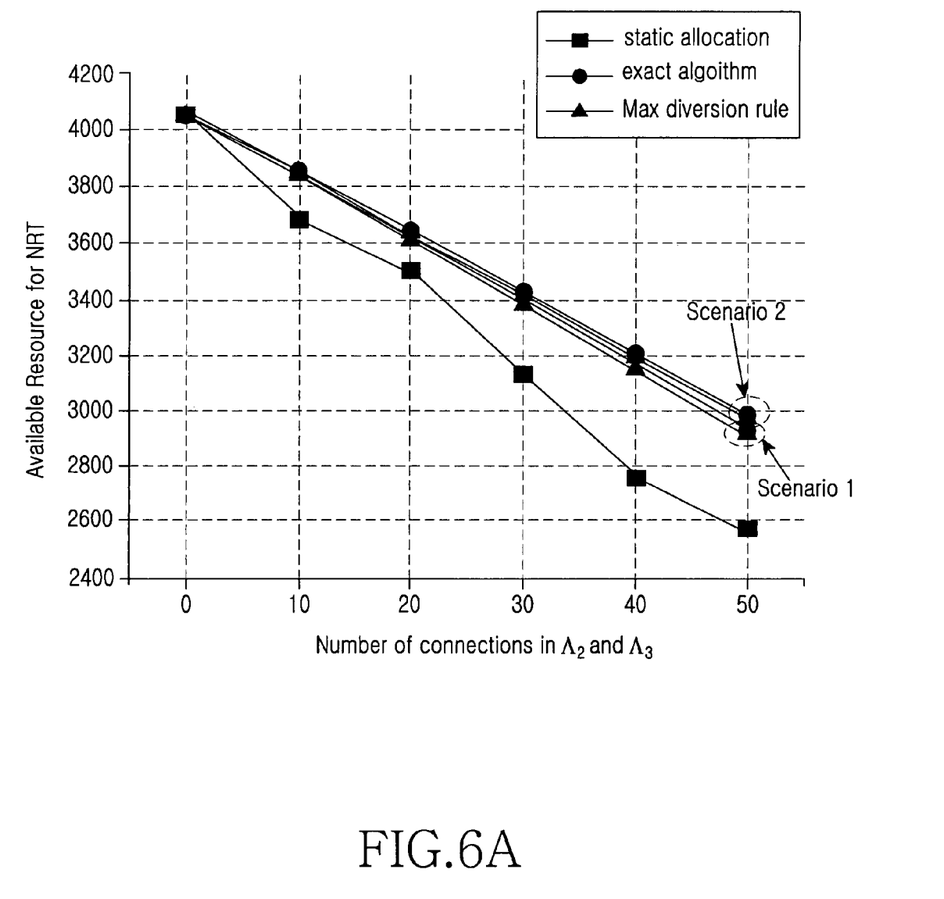
FIGS. 6A and 6B illustrate performance evaluations in which the maximum diversion rule is applied in accordance with the present invention.
Figure 6B:
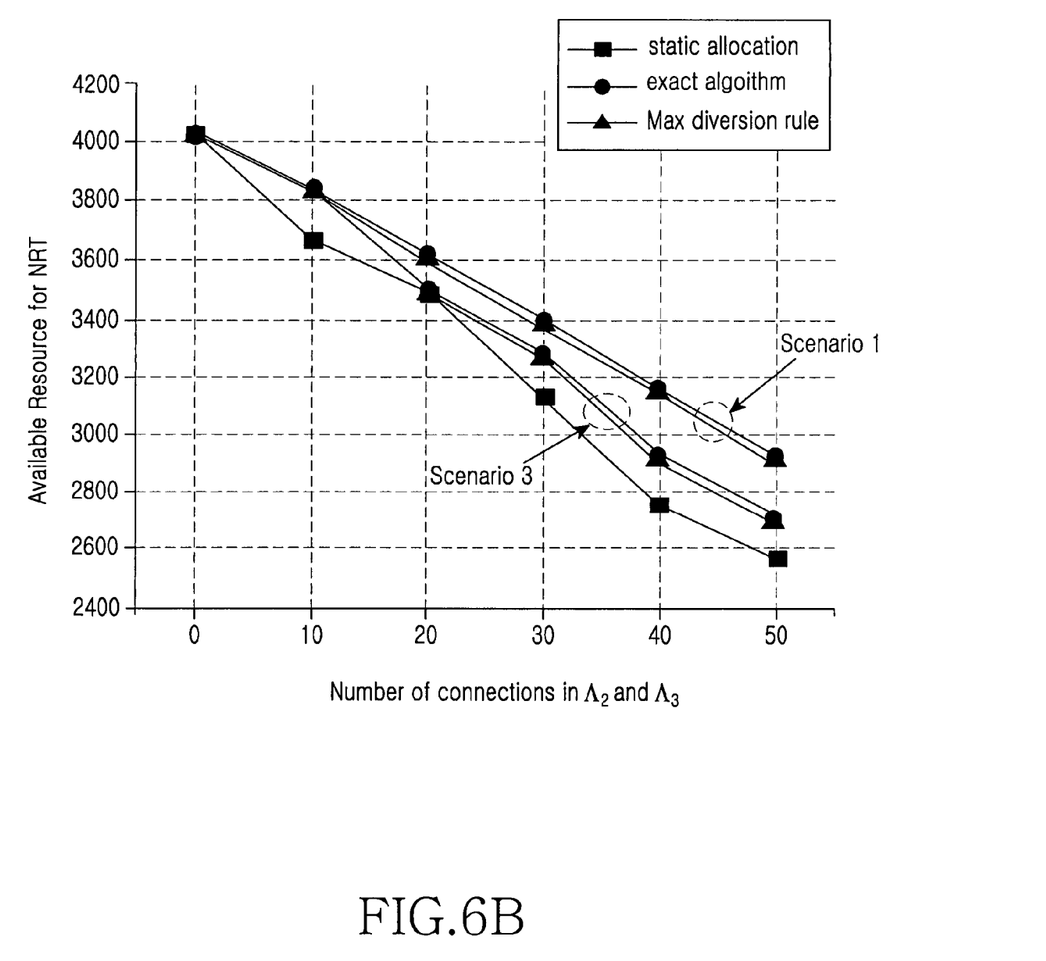

FIGS. 6A and 6B illustrate performance evaluations in which the maximum diversion rule is applied according to the present invention.

TABLE 2

| MCS index | modulation scheme | code rate | no. of bits per segment |
|---|---|---|---|
| 1 | QPSK | 3/8 | 336 |
| 2 | QPSK | 3/4 | 672 |
| 3 | 16QAM | 9/16 | 1008 |
| 4 | 16QAM | 3/4 | 1344 |
| 5 | 64QAM | 5/8 | 1680 |
| 6 | 64QAM | 3/4 | 2016 |

Table 2 shows modulation and coding schemes applied in a mobile communication system with a differential segment structure. Here, it is assumed that data traffic is RT data traffic. Further, it is assumed that when a bandwidth of 512 kbits/s is required for an ith RT connection, $b_i$ corresponds to $b_i$=6,733 bits/frame, and $\rho_i$ is given as $\rho_i$=0.9. Although RT connections are divided into 6 sets in Table 1, RC type segment and RB type segment sets are grouped into one RT type segment set, and thus the number of sets is reduced to 3. That is $\Lambda_1$ corresponds to when a mobile station has only an RT connection, $\Lambda_2$ corresponds to when a mobile station has RT and NRC connections, and $\Lambda_3$ corresponds to when a mobile station has RT and NRB connections. Experimental scenarios are given below in Table 3.

TABLE 3

| scenario classification | RT connection | $[\alpha_{i1}, \alpha_{i2}]$ | $[r_{i1}, r_{i2}]$ |
|---|---|---|---|
| common scenario 1 | $\Lambda_1$ | 336, n/a | 1, n/a |
| | $\Lambda_2$ | 672, 1344 | 1, 0.8 |
| | $\Lambda_3$ | 336, 1008 | 1, 0.7 |
| scenario 2 | $\Lambda_2$ | 672, 2016 | 1, 0.8 |
| | $\Lambda_3$ | 336, 1344 | 1, 0.7 |
| scenario 3 | $\Lambda_2$ | 672, 1344 | 1, 0.5 |
| | $\Lambda_3$ | 336, 1008 | 1, 0.3 |

In Table 3, it is assumed that $r_{i1}$=1, and mobile stations having RT connections belonging to the same group are the same in terms of a transfer rate and a QoS state. In common to the graphs of FIGS. 6A and 6B, 5 RT connections corresponding to $\Lambda_1$ were established, and experiments were performed while RT connections corresponding to $\Lambda_2$ and $\Lambda_3$ increased by 10, respectively in each scenario. In the drawings, the maximum diversion rule algorithm of the present invention is compared with the static allocation scheme and the branch and boundary method.

As illustrated in FIGS. 6A and 6B, the maximum diversion rule algorithm exhibits performance closest to that obtained by directly solving the mixed integer problem, and is improved in performance as compared with the static allocation scheme. Further, it can be noted that scenario 2 has the relatively higher transfer rate of an NRT type segment than that of scenario 3, and scenario 3 has the relatively lower degree of QoS satisfaction than that of scenario 1. Furthermore, FIG. 6B shows that there is a significant difference between performances of scenarios 1 and 3. That is, the segment diversion and allocation scheme is more susceptible to the degree of QoS satisfaction rather than the transfer rate of an NRT type segment.

According to the present invention as described above, since NRT type segments are diverted to and used for RT connections, bandwidths required by RT connections can be satisfied while less resources are employed. Further, by performing segment diversion by using the maximum diversion rule of the present invention, the amount of operations can be minimized.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method for managing resources in a base station of a mobile communication system, the method comprising the steps of:
    classifying an overall frequency band into a plurality of segment types defined in time and frequency domains by considering a channel condition between a mobile station and the base station and a Quality of Service (QoS) level required by the mobile station;
    allocating, if data to be transmitted in real time is present, the data to real-time type segments in such a manner as to satisfy a minimum QoS level for the data; and
    diverting and allocating the real-time data to non-real-time type segments, when there remains real-time data after allocating the data, and further remains non-real-time type segments for allocating data to be transmitted in non-real time,
    wherein, in the step of diverting and allocating the real-time data to the non-real-time type segments, the real-time data is allocated to the non-real-time type segments if a QoS satisfaction index is equal to or higher than a reference value, when the real-time data is allocated to and transmitted through the non-real-time type segments.

2. The method as claimed in claim 1, wherein signal processing schemes according to the plurality of segment types are used.

3. The method as claimed in claim 1, wherein the plurality of segment types comprise:
    a first segment type corresponding to when a QoS of data to be transmitted through a corresponding segment is a non-real-time service, and a mobile station targeted by the data to be transmitted through the corresponding segment is located in a cell center region;
    a second segment type corresponding to when the QoS of data to be transmitted through a corresponding segment is a real-time service, and a mobile station targeted by the data to be transmitted through the corresponding segment is located in a cell center region;
    a third segment type corresponding to when the QoS of data to be transmitted through a corresponding segment is a non-real-time service, and a mobile station targeted by the data to be transmitted through the corresponding segment is located in a cell boundary region; and
    a fourth segment type corresponding to when the QoS of data to be transmitted through a corresponding segment is a real-time service, and a mobile station targeted by the data to be transmitted through the corresponding segment is located in a cell boundary region.

4. The method as claimed in claim 1, wherein the minimum QoS level uses a minimum level of modulation and coding scheme in which the real-time data is transmitted in real time.

5. The method as claimed in claim 1, wherein the diverting and allocating the real-time data to the non-real-time type segments is performed for the mobile station capable of making both real-time and non-real-time connections.

6. The method as claimed in claim 1, wherein, in the step of diverting and allocating the real-time data to the non-real-time type segments, the real-time data is allocated to the non-real-time type segments when a data transfer rate by use of the non-real-time type segments is higher than a data transfer rate by use of the real-time type segments.

7. The method as claimed in claim 1, wherein, in the step of diverting and allocating the real-time data to the non-real-time type segments, the real-time data is allocated to the non-real-time type segments when a QoS level of the real-time data is lower than a preset QoS level.

8. The method as claimed in claim 1, wherein, in the step of diverting and allocating the real-time data to the non-real-time type segments, the real-time data is allocated to the non-real-time type segments when a required bandwidth of the real-time data is lower than a preset required bandwidth.

9. An apparatus for managing resources in a mobile communication system, the apparatus comprising:
    a classifier for classifying an overall frequency band into a plurality of segment types defined in time and frequency domains by considering a channel condition between a mobile station and a base station and a Quality of Service (QoS) level required by the mobile station, and determining whether transmission data is data to be transmitted in real time when the transmission data is input;
    a segment map determiner for determining a real-time type segment map and a diversion ratio, in which real-time type segments are diverted to non-real-time type segments, in such a manner as to satisfy a minimum QoS level for the data if the data is real-time data; and
    a packet scheduler for diverting and allocating the real-time data to the non-real-time type segments in a manner corresponding to the diversion ratio,
    wherein the segment map determiner determines the diversion ratio for allocating the real-time data to the non-real-time type segments if a QoS satisfaction index is equal to or higher than a reference value, when the real-time data is allocated to the non-real-time type segments.

10. The apparatus as claimed in claim 9, wherein the plurality of segment types classified by the classifier comprise:
    a first segment type corresponding to when a QoS of data to be transmitted through a corresponding segment is a non-real-time service, and a mobile station targeted by the data to be transmitted through the corresponding segment is located in a cell center region;
    a second segment type corresponding to when the QoS of data to be transmitted through a corresponding segment is a real-time service, and a mobile station targeted by the data to be transmitted through the corresponding segment is located in a cell center region;
    a third segment type corresponding to when the QoS of data to be transmitted through a corresponding segment is a non-real-time service, and a mobile station targeted by the data to be transmitted through the corresponding segment is located in a cell boundary region; and a fourth segment type corresponding to when the QoS of data to be transmitted through a corresponding segment is a real-time service, and a mobile station targeted by the data to be transmitted through the corresponding segment is located in a cell boundary region.

11. The apparatus as claimed in claim 9, wherein the minimum QoS level uses a minimum level of modulation and coding scheme in which the real-time data can be transmitted in real time.

12. The apparatus as claimed in claim 9, wherein the packet scheduler diverts and allocates the real-time data to the non-real-time type segments for the mobile station capable of making both real-time and non-real-time connections.

13. The apparatus as claimed in claim 9, wherein the segment map determiner determines the diversion ratio for allocating the real-time data to the non-real-time type segments when a data transfer rate by use of the non-real-time type segments is higher than a data transfer rate by use of the real-time type segments.

14. The apparatus as claimed in claim 9, wherein the segment map determiner determines the diversion ratio for allocating the real-time data to the non-real-time type segments when a QoS level of the real-time data is lower than a preset QoS level.

15. The apparatus as claimed in claim 9, wherein the segment map determiner determines the diversion ratio for allocating the real-time data to the non-real-time type segments when a required bandwidth of the real-time data is lower than a preset required bandwidth.

* * * * *